United States Patent [19]

Snell

[11] Patent Number: 5,499,765
[45] Date of Patent: Mar. 19, 1996

[54] NOZZLE CAPABLE OF VARYING THE DIRECTION OF DISCHARGE OF FLUID THEREFROM

[75] Inventor: Leonard S. Snell, Bristol, United Kingdom

[73] Assignee: Rolls-Royce Limited, London, United Kingdom

[21] Appl. No.: 831,101

[22] Filed: Oct. 25, 1985

Related U.S. Application Data

[63] Continuation of Ser. No. 443,301, Sep. 27, 1982, abandoned.

[30] Foreign Application Priority Data

Oct. 13, 1981 [GB] United Kingdom .................... 8130909

[51] Int. Cl.[6] ............................................... B63H 11/107
[52] U.S. Cl. ........................................................ 239/265.19
[58] Field of Search .............................. 60/228, 230, 232, 60/271; 239/265.11, 265.13, 265.19, 265.33, 265.35; 244/3.22, 12.5, 52

[56] References Cited

U.S. PATENT DOCUMENTS

| | | | |
|---|---|---|---|
| 2,570,629 | 10/1951 | Anxionnaz et al. | 239/265.33 |
| 3,150,485 | 9/1964 | Hickerson | 60/271 |
| 3,888,419 | 6/1975 | McCullough et al. | 239/265.19 |
| 4,131,246 | 12/1978 | Rotmans | 244/3.22 |

FOREIGN PATENT DOCUMENTS

| | | | |
|---|---|---|---|
| 2320076 | 11/1974 | Germany | 60/230 |
| 661437 | 11/1951 | United Kingdom . | |
| 781466 | 8/1957 | United Kingdom . | |
| 906622 | 9/1962 | United Kingdom . | |
| 965490 | 7/1964 | United Kingdom . | |
| 1083738 | 9/1967 | United Kingdom . | |
| 1092021 | 11/1967 | United Kingdom . | |
| 1362106 | 7/1974 | United Kingdom | 60/271 |

OTHER PUBLICATIONS

J. W. Ryan, Guns, Mortars & Rockets, 1982, pp. 146–147.
PWA OI 200, The Aircraft Gas Turbine Engine And Its Operation, United Aircraft, 1960, pp. 52–55.

*Primary Examiner*—Stephen C. Bentley
*Attorney, Agent, or Firm*—Oliff & Berridge

[57] ABSTRACT

A nozzle is provided which is capable of varying the direction of discharge of a fluid. As shown in FIG. 2 the nozzle 11 has sidewalls defining a circular opening 12 and a plug 14 mounted within the nozzle for transverse movement in the plane of the nozzle outlet. Thus a component of velocity can be imparted to the jet in any direction around 360° in the plane of the nozzle outlet.

Operation of the nozzle is by means of a plurality of piston-in-cylinder devices 18,20 acting between the plug 14 and the nozzle sidewalls. The plug is mounted on an arm 15 in a universal joint 16.

6 Claims, 2 Drawing Sheets

5,499,765

NOZZLE CAPABLE OF VARYING THE DIRECTION OF DISCHARGE OF FLUID THEREFROM

This is a continuation of application Ser. No. 443,301 filed Sep. 27, 1982, now abandoned.

The present invention relates to nozzles capable of varying the effective direction of discharge of fluid therefrom and has particular reference to exhaust nozzles for gas turbine engines.

Many types of nozzles are known for this purpose in the gas turbine engine field. Perhaps the most well-known are the rotatable bent nozzles used, for example, on the Rolls-Royce Pegasus engine to provide either vertical or horizontal thrust. These nozzles, however, allow thrust vectoring only in a single plane.

Sometimes, however, there is a requirement to provide thrust vectoring in more than one plane or to provide nozzle area variation in addition to thrust vectoring. The achievement of these further capabilities has hitherto produced nozzles having very complex mechanisms.

An object of the present invention is to provide a nozzle mechanism capable of achieving thrust vectoring in a single plane without the use of large diameter rotatable pipes.

Another object of the invention is to provide a relatively simple mechanism capable of providing thrust vectoring in more than one plane, or to achieve both thrust vectoring and area variation.

These objects are achieved according to the present invention using a nozzle such as defined by any one of the appendent claims.

Embodiments of the invention will now be described by way of example only and with reference to the accompanying drawings in which.

Figure 1:
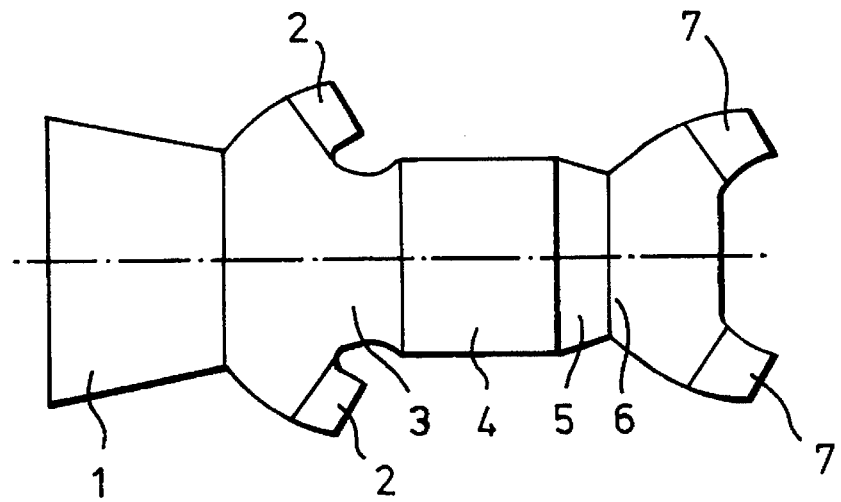
FIG. 1 shows diagrammatically a known type of gas turbine engine having vectorable exhaust nozzles.

FIG. 1 illustrates a known form of gas turbine engine having a first compressor 1 and a pair of front vectorable nozzles 2, through which part of the air compressed by the first compressor passes to atmosphere. The remainder of the air from the first compressor passes to a second compressor 3, combustion equipment 4, turbines 5 and into a bifurcated jet pipe 6 which terminates in a pair of rear vectorable exhaust nozzles 7. The front and rear vectorable nozzles are rotatable by means not shown in order to exhaust the gases passing therethrough in a rearward or downward direction, to provide forward thrust or vertical lift on the engine.

Because these nozzles are mounted symmetrically in pairs around the engine axis, any side-loads which may be produced while the nozzles are being rotated are cancelled, and no net transverse loads are felt by an aircraft in which the engine is mounted.

Where it is required to vary the direction of thrust transversely, for example, in an aircraft such as that disclosed in our co-pending patent application No. 8119086, the rotating nozzles described above are difficult to adapt.

Figure 3:
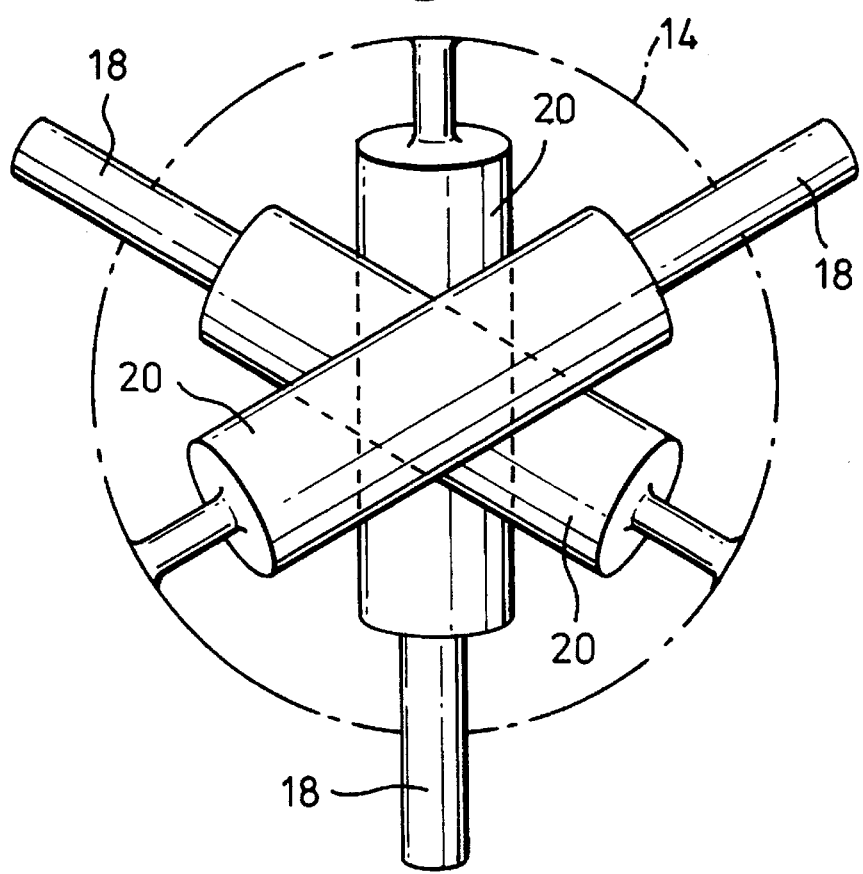
FIG. 3 is an enlarged diagrammatic view of the operating pistons of the nozzle of FIG. 2 showing the relationship between them.
Figure 2:
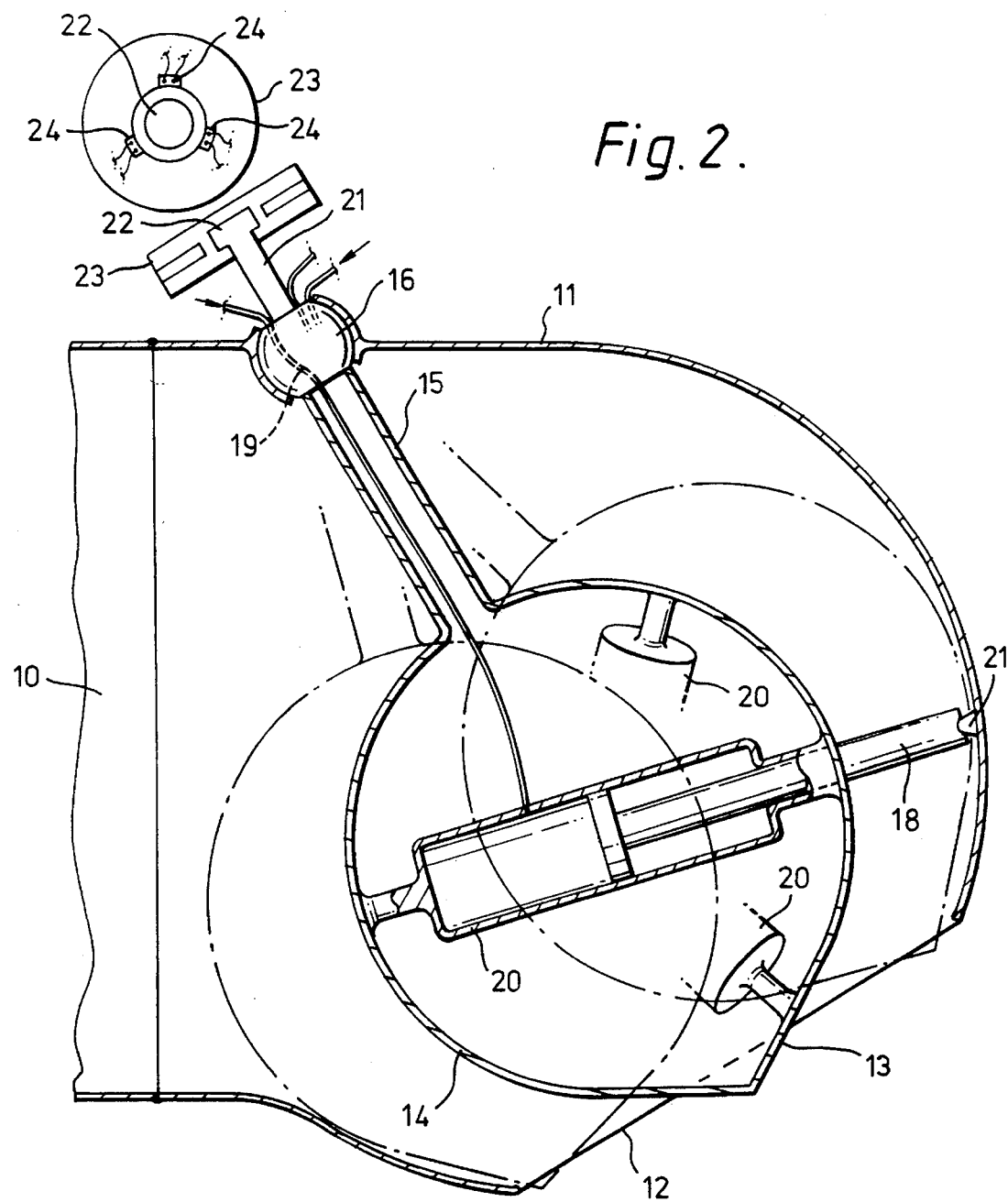
FIG. 2 shows one embodiment of a nozzle according to the invention having a circular exhaust outlet and a spherical plug to give thrust vectoring over 360° in the plane of the exhaust outlet.

Referring now to FIGS. 2 and 3 there can be seen a jet pipe 10 of a gas turbine engine having a curved nozzle 11 attached thereto at the downstream end thereof. The sidewalls of the nozzle 11 terminate in a circular exhaust outlet 12 into which protrudes a conical region 13 of an otherwise spherical plug 14 carried by the nozzle structure.

The nozzle structure in this embodiment remains fixed, and the spherical plug 14 is mounted on an arm 15 carried from the nozzle structure by means of a universal joint 16 which enables the plug to be moved in any direction substantially in the plane of the exhaust outlet 12.

It can be seen that the conical region 13 of the plug projecting from inside the nozzle to a point just beyond the outlet plane, creates an annular outlet area for any flow issuing from the nozzle, when the plug is in the central position shown in full lines. By virtue of the universal mounting of the supporting arm, however, the plug can be moved to any position up to and including the positions indicated by the dotted lines, which define extreme positions, and cause the flow to issue from the nozzle with a significant transverse component of velocity. The downstream sidewalls of the nozzle adjacent the outlet 12 are shaped to define with the plug appropriately shaped passages to constrain the flow to leave the outlet in the desired direction.

One method of causing said plug movement is by means of three pistons 18, disposed at 120° to each other (only one of which is shown in FIG. 2). The pistons are housed in cylinders 20 carried within the plug, and push on slipper pads 21 on the inside of the nozzle wall. The pistons are fed with an .operating fluid, preferably air, through tubes 19 passing through the support arm 15. FIG. 3 shows how the three pistons and cylinders are positioned, one above the other to provide the required 360° of movement of the plug in the plane of the nozzle outlet.

Clearly there are many variations of this operating mechanism which can be used, for example, since the nozzle structure is fixed, the cylinders could be mounted on the structure and contain piston rods which extend inwardly to push on the plug. Alternatively, drag cables, could be attached to the plug and passed through the structure to be pulled from outside the nozzle, or flexible drives may be used to operate screw jacks. The manner of operation is a matter of design expediency and is not a limiting feature of-the novel nozzle.

Similarly some form of feedback mechanism is desirable to tell the pilot the actual position of the nozzle particularly if positions of the plug are required between the central position and the extreme positions shown. However, the choice of feedback mechanism is once again a matter of design expediency within the knowledge of the ordinary designer.

One simple form of feedback is shown in FIG. 2 and consists of an extension 21 on the radially outer end of the arm 15, and which terminates in a circular flange 22. The flange 22 is positioned in a housing 23 which contains proximity sensors 24 spaced at 120° around its periphery. The sensors 24 provide an electrical signal based on the position of the flange relative thereto, and the signals can be used either to provide automatic or manual control of the position of the plug.

An additional feature of the invention is that by moving the plug in a direction at right angles to the plane of the outlet, the nozzle area can be varied.

It can be seen that the nozzle structure does not rotate so that no large diameter bearings are required, and there is no need for a complex gear mechanism to enable the nozzle area variation drive to pass across a joint between rotating and static parts of the nozzle.

Clearly, if greater degrees of thrust vectoring are required than can be achieved simply by movement of the plug, a limited degree of rotational movement of the nozzles on the jet pipe may additionally be provided.

I claim:

1. An axi-symmetric fluid nozzle capable of varying the direction of discharge of fluid therefrom comprising:

sidewalls forming a curved nozzle and terminating in a convergent fixed area outlet;

a generally spherical plug disposed within the nozzle, said plug having a conical region projecting through the outlet to define therewith the final discharge area of the nozzle;

a ball-type universal joint mounted to one of said nozzle sidewalls upstream of the plug substantially where a central axis of said outlet intersects said one sidewall;

an arm, one end of which is mounted on said ball-type universal joint and the other end of which has said plug mounted thereon, whereby said plug and arm can be rotated about said universal joint such that said plug can be moved in any direction substantially in the plane of said outlet; and means for moving said plug.

2. An axi-symmetric nozzle according to claim 1 and wherein the means for causing movement of the plug comprises three independently operable piston-in-cylinder mechanisms.

3. An axi-symmetric nozzle according to claim 2, wherein:

the ball of said ball-type universal joint has a central passage formed therein with one end opening outside of said sidewall and another end opening inside of said sidewall;

said plug is substantially hollow and said three piston-in-cylinder mechanisms are disposed substantially within said hollow spherical plug; and said arm has a central passage formed therein with one end connected to said second opening of said ball and another end opening into the inside of said plug;

and further comprising at least one pneumatic tube connected between each piston-in-cylinder mechanism and a pressurized operating fluid source outside of said sidewalls, each said pneumatic tube extending through said central passages of said arm and ball.

4. An axi-symmetric nozzle according to claim 2, wherein the piston of each piston-in-cylinder mechanism extends through walls of said plug and abuts against said sidewalls of said nozzle.

5. An axi-symmetric nozzle according to claim 2 wherein a feedback mechanism is provided to give an indication of the position of the plug.

6. An axi-symmetric nozzle according to claim 1 wherein a feedback mechanism is provided to give an indication of the position of the plug.

* * * * *